United States Patent [19]
Secrist, III et al.

[11] 3,893,998
[45] July 8, 1975

[54] FLUORESCENT DERIVATIVES OF CYTOSINE-CONTAINING COMPOUNDS

[75] Inventors: John A. Secrist, III, Cambridge, Mass.; Jorge R. Barrio; Nelson J. Leonard, both of Urbana; Laurence G. Dammann, Champaign, all of Ill.

[73] Assignee: University of Illinois Foundation, Urbana, Ill.

[22] Filed: Feb. 22, 1973

[21] Appl. No.: 334,674

[52] U.S. Cl. ............................ 260/211.5 R; 250/483
[51] Int. Cl. ................................................ C07d 51/52
[58] Field of Search .......................... 260/211.5 R

[56] References Cited
UNITED STATES PATENTS 3,462,416  8/1969  Hanze et al. ............... 260/211.5 R
3,701,772  10/1972  Tamura et al. .............. 260/211.5 R
3,712,885  1/1973  Weimann et al. ............ 260/211.5 R

OTHER PUBLICATIONS

Barrio, Jorge R., Biochemical and Biophysical Research Communications, Vol. 46, No. 2, 1972.

Primary Examiner—Johnnie R. Brown
Attorney, Agent, or Firm—Merriam, Marshall, Shapiro & Klose

[57] ABSTRACT

Fluorescent analogs of biologically active coenzymes are made by reaction of certain cytosine-containing coenzymes with chloroacetaldehyde. The reaction products have improved biologic activity, and have improved utility for the investigation of enzyme processes.

8 Claims, No Drawings

FLUORESCENT DERIVATIVES OF CYTOSINE-CONTAINING COMPOUNDS

The invention described herein was made in the course of, or under, a grant from the National Institutes of Health, Department of Health, Education and Welfare.

BRIEF SUMMARY OF THE INVENTION

This invention relates to certain novel fluorescent coenzymes of improved biological activity and to a method of making these coenzymes. More particularly, the invention relates to cytidine derivatives which have been reacted with chloroacetaldehyde to produce fluorescent reaction products having improved biologic activity.

Among the essential constituents of living matter are coenzymes, included among which are the nucleotide and nucleoside derivatives of certain heterocyclic bases such as adenosine and cytosine. Such compounds act as universal stoichiometric coupling agents between metabolic sequences, as regulatory modifiers of these sequences, and as the means for energy utilization and storage in metabolic sequences.

In accordance with the invention we have discovered that the biologic activity of certain coenzymes derived from cytosine can be markedly increased by reacting the coenzyme with chloroacetaldehyde, whereby there is introduced an etheno bridge between the 3- and $N^4$-positions of the cytosine ring. Quite unexpectedly, the novel coenzymes of the invention show greater biologic activity than their unmodified counterparts. In addition, the modified coenzymes exhibit fluorescent properties not possessed by the original coenzymes.

DETAILED DESCRIPTION OF THE INVENTION

The novel coenzymes of the invention consist of:
A. Compounds having the formula

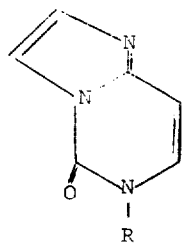

wherein R has any of the following formulas:

(1)

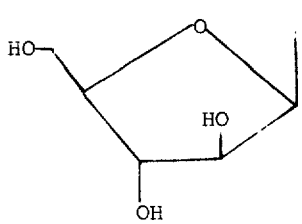

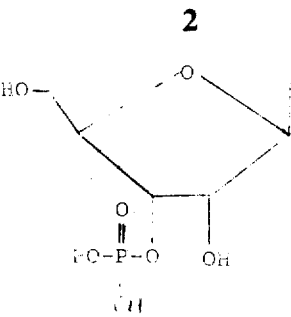

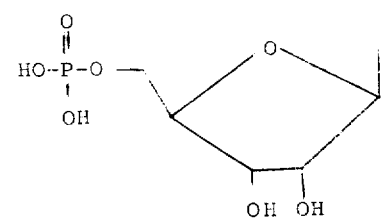

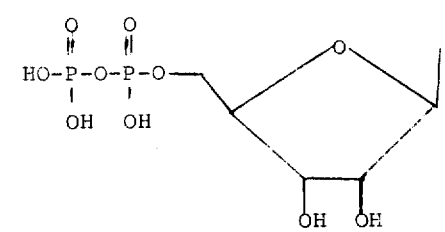   (3)

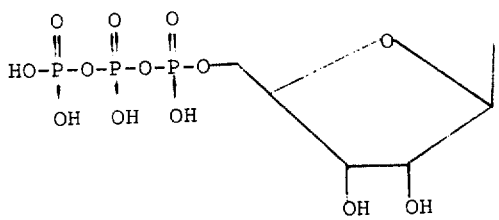   (4)

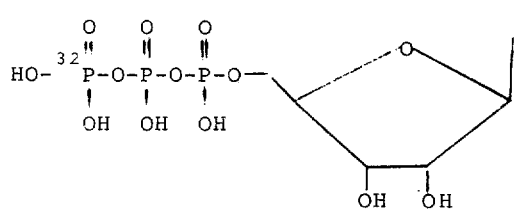   (5)

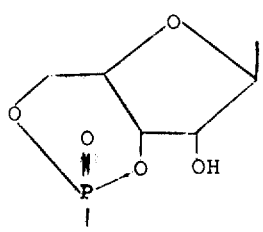   (6)

B. anhydrides of A(3) above with nicotinamide mononucleotide or flavin mononucleotide, and dinucleoside phosphates derived therefrom; and C. salts of any of the compounds of Groups (A) or (B) above.

It will be noted that the compounds of the invention are derivatives of cytosine in which an etheno (—CH=CH—) bridge is present between the 3- and $N^4$-sitions of the cytosine ring. The abbreviation "$\epsilon$," representing "etheno", will be used herein to refer to this etheno bridge, and using this nomenclature, the novel compounds of Group A above can be designated as 1. 3,$N^4$-ethenoarabinosylcytosine (ara-$\epsilon$C)
2. 3,$N^4$-ethenocytidine 3'-monophosphate (3'-$\epsilon$CMP)
3. 3,$N^4$-ethenocytidine 5'-monophosphate (5'-$\epsilon$CMP)
4. 3,$N^4$-ethenocytidine 5'-diphosphate (5'-$\epsilon$CDP)
5. 3,$N^4$-ethenocytidine 5'-triphosphate (5'-$\epsilon$CTP)
6. 3,$N^4$-ethenocytidine 5'-$\gamma$-$^{32}$P-triphosphate ($\gamma$-$^{32}$P-$\epsilon$CTP)
7. 3,$N^4$-ethenocytidine 3',5'-cyclic-monophosphate (3',5'-cyclic $\epsilon$CMP)

The members of Group (B) are nicotinamide 3,$N^4$-ethenocytosine dinucleotide ($\epsilon$NCD$^+$) and flavin-3,$N^4$-ethenocytosine dinucleotide ($\epsilon$FCD). These compounds are anhydrides of 5'-$\epsilon$CMP with nicotinamide mononucleotide or flavin mononucleotide, both of which are known materials. The members of Group (C) are salts, which can be made from the novel compounds of the invention in conventional fashion, by neutralizing one or more acid groups which may be present in the compound with an inorganic base such as NaOH. In addition, acid addition salts can be made by reacting the compound with an inorganic acid, such as HCl.

The novel coenzymes of the invention are prepared by reacting the parent coenzyme (e.g., CTP) with chloroacetaldehyde to introduce the 3,$N^4$-etheno bridge into the cytosine ring. The reaction takes place readily in solution at a pH within the range of about 1–8 and preferably about 3.0–5.5, and proceeds quantitively to completion over a period of about 24–168 hours. The temperature of reaction is not critical; any temperature above the freezing point of the solution to the boiling point of chloroacetaldehyde (85°C.) can be used, although a preferred temperature range is about 20°–50°C., and room temperature is usually suitable.

For forming the solution of the coenzyme and chloroacetaldehyde, any solvent which is compatible with the reactants can be used. Water is preferred, although organic solvents, such as ethanol, isopropyl alcohol, dimethyl formamide, and acetonitrile, can also be used. The concentration of the solution is similarly not critical and is limited only by the solubility of the reactants in the selected solvents. Concentrations on the order of about 1.0–2.0 molar chloroacetaldehyde are typical and can be used effectively.

EXAMPLES

Illustrative of the compounds of the invention are those whose properties are given below in Table 1. These compounds were prepared by stirring a solution of 2 millimoles of the cytidine derivative in 20 ml. of 2 M aqueous chloroacetaldehyde at pH 3.0–3.5 for 2–7 days at a temperature of 20°–72°C. The resulting reaction product was decolorized with charcoal and evaporated to dryness under vacuum. Reprecipitation from aqueous ethanol followed by an ethanol wash gave pure products. If needed, chromatography on DEAE Sephadex using a gradient of ammonium formate (0.5 to 1.2 M) (pH about 3.7) produced excellent purification of the $\epsilon$C nucleotide derivatives. The compounds listed in Table 1 were made following this method. Each pure product was characterized by analysis, chromatography, and spectroscopic methods.

As indicated in Table I, the compounds of the invention are fluorescent, having a maximum emission in the ultraviolet spectrum at about 347 nm. in acidic solution, upon excitation at 280 nm. All of the compounds of the invention with the exceptions of $\epsilon$NCD$^+$ and $\epsilon$FCD have similar fluorescent properties.

TABLE I

| Compound | Formula and Molecular Wt. | Analysis Calcd. | Found | Fluorescence Data Emission[a] nm |
|---|---|---|---|---|
| 5'-$\epsilon$CMP | $C_{11}H_{13}N_3O_8PNa\cdot1.5H_2O$ 396.23 | %C: 33.33 %H: 4.15 | 33.34 4.07 | 347 |
| $\epsilon$CDP | $C_{11}H_{14}N_3O_{11}P_2Na\cdot H_2O$ 467.20 | %C: 28.28 %H: 3.45 | 28.01 3.67 | 347 |
| $\epsilon$CTP | $C_{11}H_{14}N_3O_{14}P_3Na_2\cdot2H_2O$ 587.18 | %C: 22.50 %H: 3.09 | 22.55 3.11 | 347 |

[a]In acidic solution upon excitation at 280 nm.

The ethenocytosine derivatives of the invention have unexpectedly been found to possess enzymatic activity greater than that of the normal unmodified substrates. The enzymatic activity of these compounds is exemplified by the data contained in Table II for $\epsilon$CDP and $\epsilon$CTP. In this work the enzyme assays were performed with a spectrophotometer at 26°C. Values of $V_{max}$ and $K_m$ were calculated from experimental data using a computer employing a leastsquares program.

Pyruvate Kinase. The assays contained in a final volume of 1 ml 100 mM KCl, 100 mM TES (tetramethylammonium N-tris (hydroxymethyl)methyl-2-aminoethanesulfonic acid buffer) pH 7.5, 20 mM MgCl$_2$, 0.2 mM NADH, 1 mM PEP, lactate dehydrogenase, and pyruvate kinase, following the decrease in absorbance at 340 nm. The concentrations used were varied from 0.04 to 0.4 mM for ADP and $\epsilon$CDP and from 1.0 to 10 mM for CDP.

3-Phosphoglycerate Kinase. These assays were performed in a medium containing 2 mM 3-phosphoglyceric acid, 50 mM TMA TES buffer pH 7.5, 20 mM MgCl$_2$, 0.2 mM NADA, glyceraldehyde-3-phosphate dehydrogenase, and 3-phosphoglycerate kinase. The reaction was followed as for pyruvate kinase. The concentrations used were varied from 0.1–1.0 mM for ATP and $\epsilon$CTP and from 0.5–5.0 mM for $\epsilon$ATP.

Adenylate Kinase (Myokinase). These reactions contained 0.30 ml of 100 mM phosphate buffer pH 7.0, 0.05 ml of 100 mM MgCl$_2$, 0.05 ml of 50 mM nucleoside triphosphate, 0.05 ml of 50 mM nucleoside monophosphate, and 0.02 ml of myokinase (50 $\mu$g/ml). After standing at room temperature for 2 hours the reactions were followed by cellulose tlc (isobutyric acid-NH$_4$OH—H$_2$O, 75:1:24).

TABLE II

Kinetic Data for $\epsilon$ Coenzymes

| Enzyme | Substrate | Binding Constant $K_m$ (mM) | Activity* $V_{max}$ |
|---|---|---|---|
| Pyruvate kinase (rabbit muscle) | $\epsilon$CDP | 0.34 (10)** | 0.55 |
| 3-Phosphoglycerate kinase (yeast) | $\epsilon$CTP | 0.85 (0.57)*** | 0.37 |

TABLE II—Continued

| | Kinetic Data for a Coenzymes | | |
|---|---|---|---|
| Enzyme | Substrate | Binding Constant $K_m$(mM) | Activity* $V_{max}$ |
| Adenylate kinase (rabbit muscle) | εCTP | Substitutes for ATP**** | |

*Relative to normal adenine nucleotide substrate.
**Value for CDP in parentheses. The higher number corresponds to poorer binding.
***Value for ATP in parentheses. Under the same conditions CTP did not show any activity.
****Followed by thin-layer chromatography on cellulose (isobutyric acid-NH₄OH—H₂O, 75:1:24).

As shown in Table II, the ability of εCTP to phosphorylate 3-phosphoglyceric acid catalyzed by yeast 3-phosphoglycerate kinase was compared to that of ATP. The phosphorylation was assayed according to the standard procedure of coupling the reaction to glyceraldehyde 3-phosphate dehydrogenase (muscle). The analog εCTP replaced ATP in this system with $K_m$ equal to 0.85, while under identical conditions the $K_m$ observed for ATP was 0.57. The $V_{max}$ value for εCTP was equal to 37% of that of ATP. Under the same conditions, unmodified CTP did not show any activity. It was determined that for CTP to show activity equivalent to that of εCTP at 0.15 mM, about 70 times higher concentration of substrate and 20 times more enzyme were required.

At the diphosphate level, εCDP showed activity comparable to ADP as a substrate for pyruvate kinase, whereas CDP was considerably less active.

At the triphosphate level, εCTP is about $1.4 \times 10^3$ times as active as CTP in ability to phosphorylate 3phosphoglyceric acid catalyzed by yeast 3-phosphoglycerate kinase and is essentially equivalent to ATP in this respect. Ability of εCTP to replace ATP permits the enzymatic synthesis of $\gamma$-$^{32}$P-εCTP by phosphate exchange. If $^{32}PO_4$ is added and NADH omitted from the 3-phosphoglycerate system, the net result is equilibration of the $\gamma$ (terminal) phosphate in the nucleoside triphosphate with the inorganic phosphate. We have prepared εCTP-$\gamma$-$^{32}$P by mixing the nucleoside triphosphate (5 mM) with $K_2H^{32}PO_4$ (0.2 mM) in a reaction buffered at pH 8.1 with Tris-HCl (50 mM) and containing $MgCl_2$ (6.25 mM), dithiothreitol (1.25 mM), 3-phosphoglyceric acid (1 mM), glyceraldehyde-3-phosphate dehydrogenase (100 μg/ml). The incorporation of $^{32}$P into triphosphate was assayed by chromatography of the reaction mixture on polyethyleneimine thin layers (Polygram, Brinkmann Instruments) which were developed with M LiCl. Radioactivities on the chromatograms were measured on a strip scanner (Packard No. 7201). It was found that the nucleoside contained about 75% $^{32}$P after 20 minutes and an equilibrium value of about 82% was achieved after about 40 minutes. The $\gamma$-$^{32}$P triphosphates made in this manner greatly facilitate the enzymatic study of these coenzyme analogs, especially in reactions where phosphate or pyrophosphate is donated to an acceptor.

The fluorescence properties of the compounds of the invention form the basis for a method for rapid detection of cytosine-containing residues. In accordance with this aspect of the present invention, etheno derivatives of cytosine-containing compounds are prepared in situ from the parent compounds by reaction with a solution of chloroacetaldehyde. The appearance of fluorescence when the treated material is illuminated by an ultraviolet lamp establishes the presence of cytosine-containing residues. The degree of fluorescence can also be used as an approximation of the amount of cytosine-containing residues in the treated material.

This method of the invention is applicable to the detection of certain cytosine-containing naturally occurring coenzymes, either in solution or chromatograms prepared by paper chromatography, thin-layer chromatography, or paper electrophoresis. Since the fluorescent derivatives of the cytosine-containing residues can be made easily at mild ambient conditions, the method as applied to a solution containing coenzymes involves adding to the solution a sufficient quantity of a solution of chloroacetaldehyde at a pH within the range of 1 to 8. In case of chromatograms, the solution of chloroacetaldehyde is sprayed onto the chromatogram. In both cases the treated material is subjected to illumination by an ultraviolet lamp, and the existence of fluorescence, detected by conventional means using a spectrofluorometer, confirms the presence of a cytosine-containing moiety in the original mixture.

The foregoing detailed description has been given for clearness of understanding only, and no unnecessary limitations should be understood therefrom, as modifications will be obvious to those skilled in the art.

We claim:

1. A biologically active fluorescent coenzyme selected from the group consisting of:

A. compounds having the formula

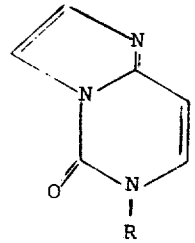

wherein R has any of the following formulas:

(1)

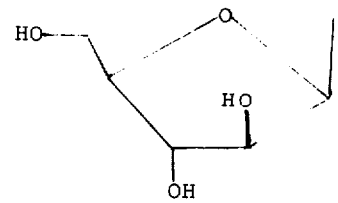

(2)

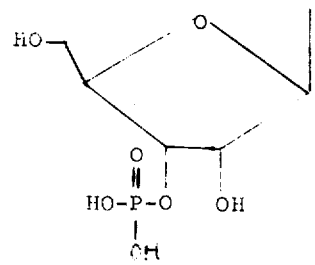

(3)

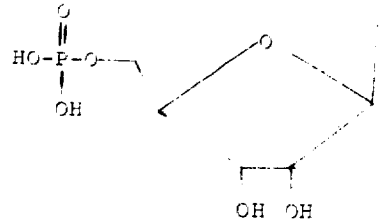

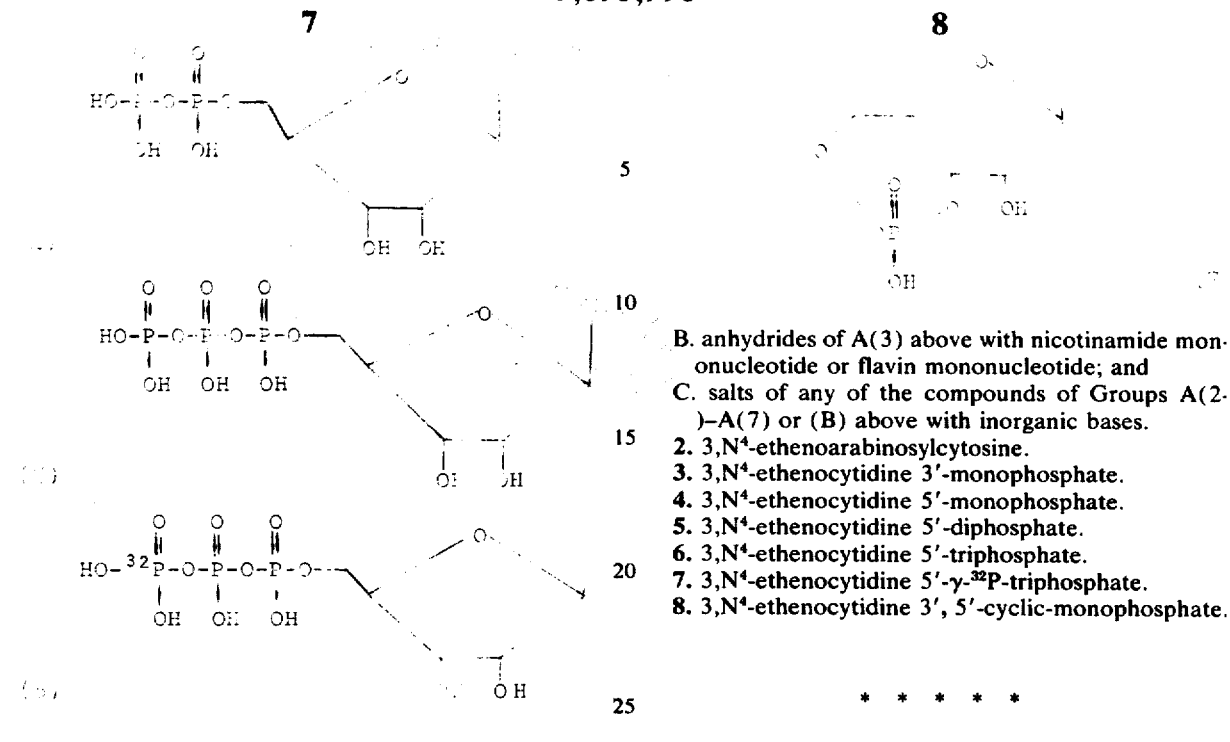

B. anhydrides of A(3) above with nicotinamide mononucleotide or flavin mononucleotide; and
C. salts of any of the compounds of Groups A(2)–A(7) or (B) above with inorganic bases.

2. 3,$N^4$-ethenoarabinosylcytosine.
3. 3,$N^4$-ethenocytidine 3'-monophosphate.
4. 3,$N^4$-ethenocytidine 5'-monophosphate.
5. 3,$N^4$-ethenocytidine 5'-diphosphate.
6. 3,$N^4$-ethenocytidine 5'-triphosphate.
7. 3,$N^4$-ethenocytidine 5'-$\gamma$-$^{32}$P-triphosphate.
8. 3,$N^4$-ethenocytidine 3',5'-cyclic-monophosphate.

* * * * *